United States Patent
Al-Sadah

(10) Patent No.: US 8,256,911 B2
(45) Date of Patent: Sep. 4, 2012

(54) SYSTEM FOR ASYNCHRONOUS REMOTE STEERING OF REFLECTORS

(75) Inventor: Jihad Hassan Al-Sadah, Safwa (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 13/103,966

(22) Filed: May 9, 2011

(65) Prior Publication Data

US 2011/0211269 A1 Sep. 1, 2011

Related U.S. Application Data

(63) Continuation of application No. 12/318,579, filed on Dec. 31, 2008, now abandoned.

(51) Int. Cl.
*G02B 5/08* (2006.01)
*G02B 7/182* (2006.01)
*F24J 2/38* (2006.01)

(52) U.S. Cl. ......... 359/851; 359/855; 126/605; 126/606
(58) Field of Classification Search .......... 126/701–703, 126/605, 606; 359/851, 855
See application file for complete search history.

(56) References Cited

U.S. PATENT DOCUMENTS

| | | | | |
|---|---|---|---|---|
| 4,106,485 A | * | 8/1978 | Polley | 126/576 |
| 4,172,443 A | * | 10/1979 | Sommer | 126/680 |
| 7,192,146 B2 | * | 3/2007 | Gross et al. | 359/853 |

* cited by examiner

*Primary Examiner* — Jade R Chwasz
(74) *Attorney, Agent, or Firm* — Robert C. Litman

(57) ABSTRACT

The system for asynchronous remote steering of reflectors has parallel asynchronous remote steering mechanisms operably connected to reflectors. A powerless (mechanical) focal beam brake is also provided. In addition to the powerless focal beam brake, a plurality of safety mechanisms are employed. Remote angle checking is provided to adapt the system for solar thermal power plants, solar furnaces, or the like.

18 Claims, 2 Drawing Sheets

SYSTEM FOR ASYNCHRONOUS REMOTE STEERING OF REFLECTORS

CROSS-REFERENCE TO RELATED APPLICATION

This application is a continuation of U.S. patent application Ser. No. 12/318,579, filed Dec. 31, 2008.

BACKGROUND OF THE INVENTION

1. Field of the Invention

The present invention relates to solar reflectors, and more particularly to a system for asynchronous remote steering of solar reflectors.

2. Description of the Related Art

Solar radiation is conceived as a renewable source of energy that is free, abundant and spatially distributed. Since solar radiation is not sufficiently concentrated, many optical methods of concentrating solar energy have been proposed. Some of the large scale concentration methods (e.g. solar thermal power plants) rely on flat surfaces that track the sun's position to reflect the direct component toward a designated target. The cost of this technology is proportional to the number of reflectors, as each reflector requires two rotating motors and two tilt sensors.

The solar reflectors should be arranged in rows and should be steered so that the reflected light from all the reflectors results in a focal point, concentrating the solar energy in a small area to do thermal/electric work.

While it seems logical to have a dedicated couple of motors per reflectors, the economic sense is against it. One way is to enlarge the reflecting area per the rotation mechanism. However, there is a limit, and often the area of a reflector should be small to simulate a concave reflector in some applications. This entails having two motors and two sensors per reflector, as there are two steered rotations required.

Thus, a system for asynchronous remote steering of reflectors solving the aforementioned problems is desired.

SUMMARY OF THE INVENTION

The system for asynchronous remote steering of reflectors has parallel asynchronous remote steering mechanisms operably connected to reflectors. A powerless (mechanical) focal beam brake is also provided. In addition to the powerless focal beam brake, a plurality of safety mechanisms are employed. Remote angle checking is provided to adapt the system for solar thermal power plants, solar furnaces, or the like.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention includes parallel asynchronous remote steering mechanisms operably connected to reflectors. A powerless (mechanical) focal beam brake is also provided. In addition to the powerless focal beam brake, a plurality of safety mechanisms are employed. Remote angle checking is provided to adapt the system for solar thermal power plants, solar furnaces, or the like.

Figure 1:
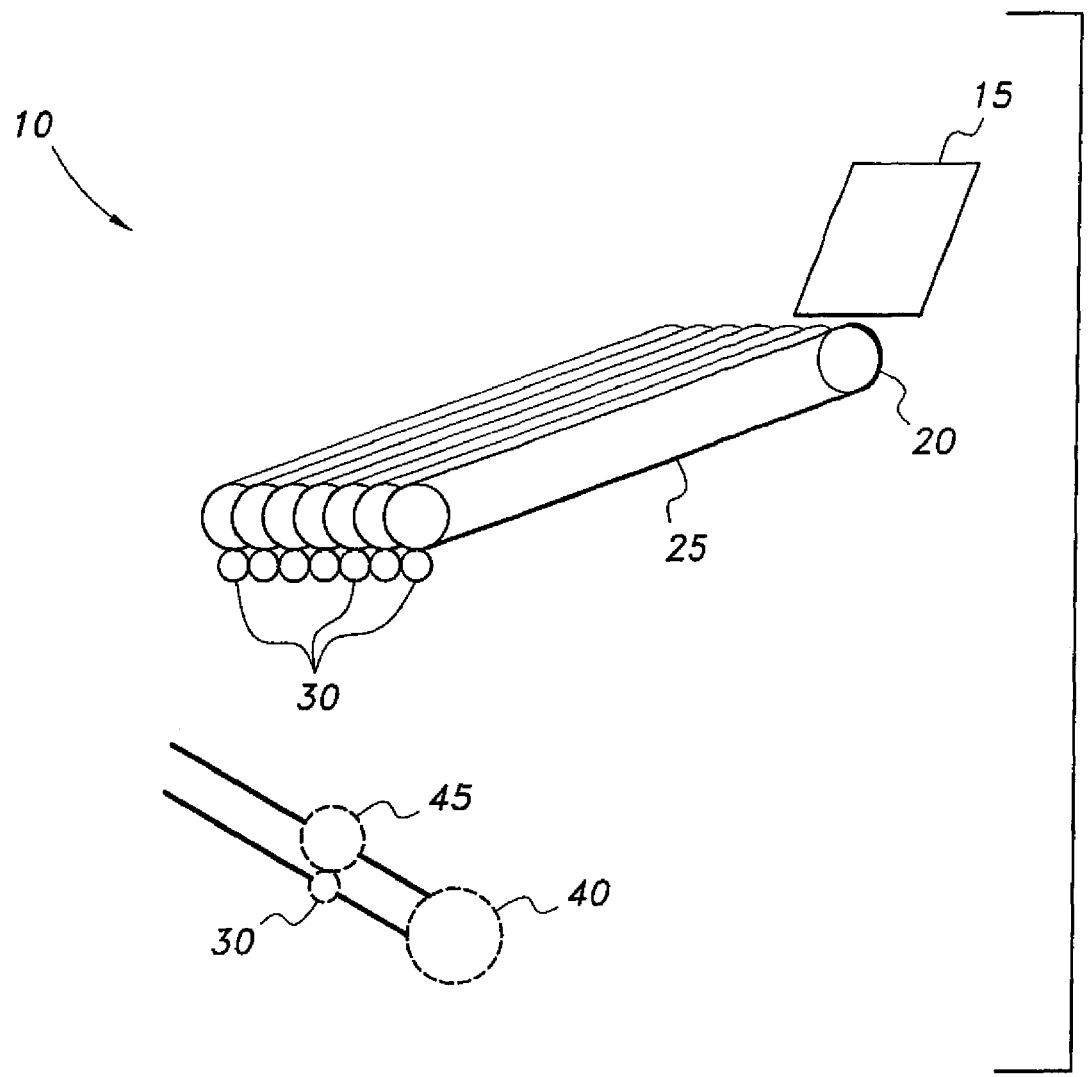
FIG. 1 is a diagrammatic view of a system for asynchronous remote steering of reflectors according to the present invention.
Figure 2:
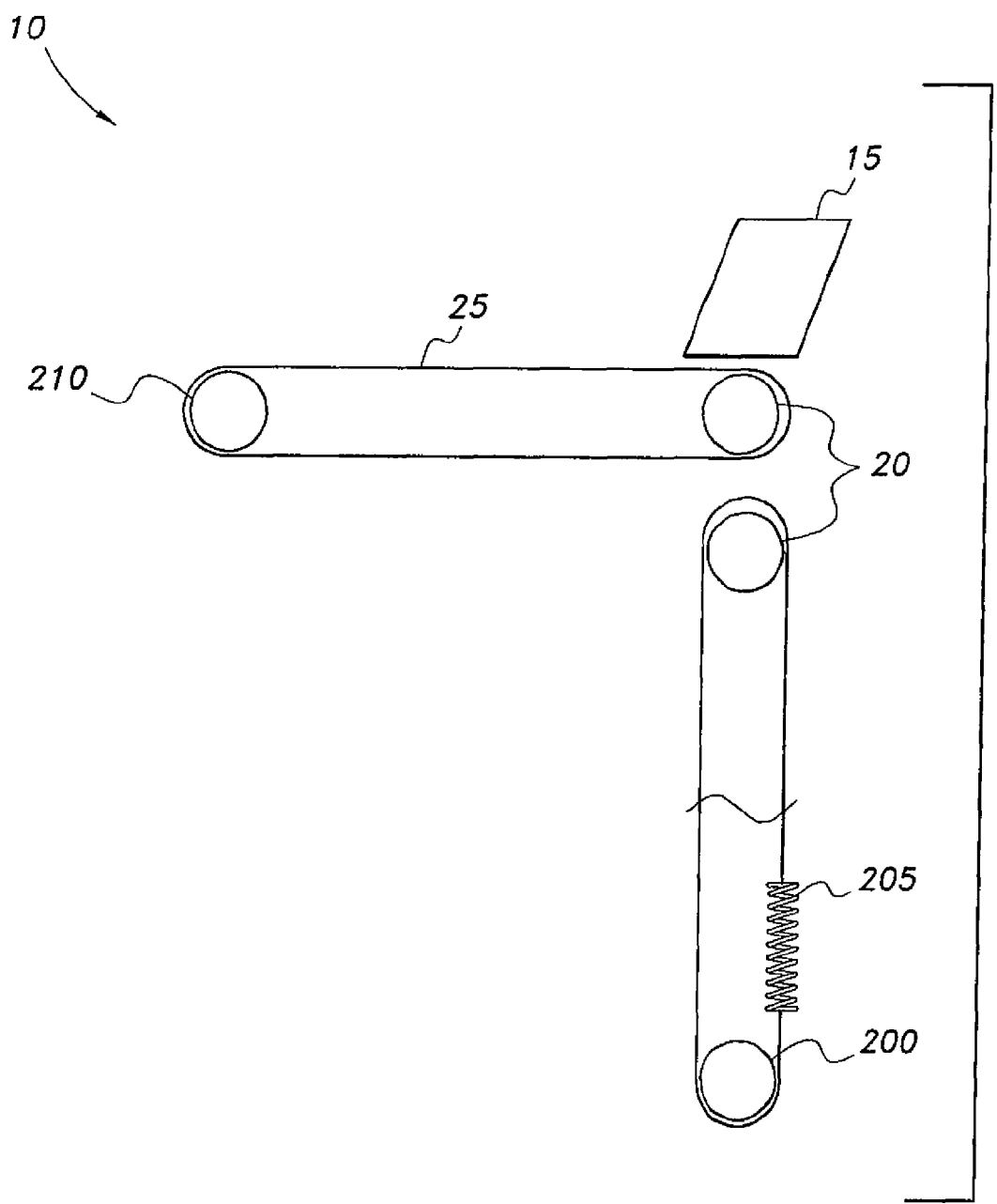
FIG. 2 is a diagrammatic view showing the central box wheels of a system for asynchronous remote steering of reflectors according to the present invention.

As shown in FIGS. 1 and 2, the system connects each mirror (reflector) 15 by cables, belts or strings 25 and pulley wheels 20 to a central electromechanical box comprising brake/unbrake motor 30, rotator motor 45 and mirror selection motor 40. As shown in FIG. 2, each mirror (reflector) 15 has a pair of driven wheels 20 that are connected to drive wheels 210 and 200, respectively, within the central box by the cables or strings 25. Each mirror is rotated by pulling a string in a desired direction within the central box, then actuating a powerless motion brake. The rotator motor 45 subsequently moves to the rest of the mirrors 15 sequentially, i.e., asynchronously, updating the direction of each mirror 15 in the array of mirrors 15.

The direction and magnitude of string motion corresponds to a computed exact tilt change and is logged within a computer that controls the system. The mechanical connection may not be perfect. Hence, calibration of the system may be accomplished by remote laser orientation measurement. Each mirror rotation mechanism is represented by a wheel 20 in a bank of wheels that are locked by a mechanical brake, e.g., a powerless (mechanical) spring-biased braking system.

The rotator motor 45 passes by each wheel 20, releases the brake motor 30, rotates the wheel 20, and then reapplies the brake motor 30. Braking motor 30, rotator motor 45, and selection motor 40 are interoperably connected to move the steering assembly along the bank of wheels to perform a reflector steering task. As most clearly shown in FIG. 2, a tension keeping spring 205 is disposed along the connection of central box drive wheel 200 (connected to braking motor 30) to driven wheel 20 on the mirror 15. Drive wheel 210 (connected to rotator motor 45) in the central box completes the connection via connection string/cable 25 to driven wheel 20.

It should be understood that each mirror 15 does not have a dedicated motor, but has a mechanical connection through strings 25 to a central rotation motor 45, thus amounting to cost savings and reduced maintenance.

One safety mechanism system ensures the breaking up of the focus in case of emergency. This is done by making each mirror's resting position (minimum energy position by, say, springs) different from the rest. In case of safety activation, a rod stops the work of all the brakes of individual mirrors, and each one goes to a predetermined non-focusing rotational position. This is sufficient to kill the concentration of the mirrors and avoid accidents, if needed.

It is to be understood that the present invention is not limited to the embodiment described above, but encompasses any and all embodiments within the scope of the following claims.

I claim:

1. A method of asynchronous remote steering of reflectors, comprising the steps of:
    establishing a desired reflecting angle for a plurality of reflectors;
    calculating an angle of rotation for each said reflector to achieve the desired reflecting angle;
    selectively driving rotation of each said reflector by the calculated angle of rotation associated therewith, wherein the selective driven rotation is performed through selective driven actuation of a first driven wheel connected to each said reflector, each said reflector being individually adjusted, driven and rotated independent of other ones of said plurality of reflectors; and
    selectively braking to cease rotation of each said reflector when the desired reflecting angle is achieved, wherein the selective braking is performed through selective driven actuation of a second driven wheel connected to each said reflector, wherein the selective driven rotation and the selective braking of said plurality of reflectors is performed asynchronously and sequentially, one of said reflectors after the other.

2. The method of asynchronous remote steering of reflectors according to claim 1, further comprising the step of calibrating the selective driven rotation and the selective braking of said plurality of reflectors.

3. The method of asynchronous remote steering of reflectors according to claim 2, wherein said step of calibrating the selective driven rotation and the selective braking of said plurality of reflectors comprises performing remote measurements of angular position of each said reflector.

4. The method of asynchronous remote steering of reflectors according to claim 3, wherein said step of performing the remote measurements of the angular position of each said reflector includes measuring the angular position with a laser.

5. The method of asynchronous remote steering of reflectors according to claim 4, further comprising the step of establishing a resting position of each said reflector, wherein the resting position of each said reflector is unique with respect to a remainder of said reflectors.

6. The method of asynchronous remote steering of reflectors according to claim 5, further comprising the step of selectively stopping braking of said plurality of reflectors to position each said reflector in a pre-determined non-focusing rotational position.

7. The method of asynchronous remote steering of reflectors according to claim 6, wherein the step of selectively driving rotation of each said reflector includes selective driven actuation of each said first driven wheel through interconnection with a single central motor.

8. A method of asynchronous remote steering of reflectors, comprising the steps of:
   establishing a desired reflecting angle for a plurality of reflectors;
   calculating an angle of rotation for each said reflector to achieve the desired reflecting angle;
   selectively driving rotation of each said reflector by the calculated angle of rotation associated therewith, wherein the selective driven rotation is performed through selective driven actuation of a first driven wheel connected to each said reflector, the selective driven actuation of each said first driven wheel being performed through interconnection with a single central motor, each said reflector being individually adjusted, driven and rotated independent of other ones of said plurality of reflectors; and
   selectively braking to cease rotation of each said reflector when the desired reflecting angle is achieved, wherein the selective braking is performed through selective driven actuation of a second driven wheel connected to each said reflector,
   wherein the selective driven rotation and the selective braking of said plurality of reflectors is performed asynchronously and sequentially, one of said reflectors after the other.

9. The method of asynchronous remote steering of reflectors according to claim 8, further comprising the step of calibrating the selective driven rotation and the selective braking of said plurality of reflectors.

10. The method of asynchronous remote steering of reflectors according to claim 9, wherein said step of calibrating the selective driven rotation and the selective braking of said plurality of reflectors comprises performing remote measurements of angular position of each said reflector.

11. The method of asynchronous remote steering of reflectors according to claim 10, wherein said step of performing the remote measurements of the angular position of each said reflector includes measuring the angular position with a laser.

12. The method of asynchronous remote steering of reflectors according to claim 11, further comprising the step of establishing a resting position of each said reflector, wherein the resting position of each said reflector is unique with respect to a remainder of said reflectors.

13. The method of asynchronous remote steering of reflectors according to claim 12, further comprising the step of selectively stopping braking of said plurality of reflectors to position each said reflector in a pre-determined non-focusing rotational position.

14. A method of asynchronous remote steering of reflectors, comprising the steps of:
   establishing a desired reflecting angle for a plurality of reflectors;
   calculating an angle of rotation for each said reflector to achieve the desired reflecting angle;
   selectively driving rotation of each said reflector by the calculated angle of rotation associated therewith, wherein the selective driven rotation is performed through selective driven actuation of a first driven wheel connected to each said reflector, the selective driven actuation of each said first driven wheel being performed through interconnection with a single central motor, each said reflector being individually adjusted, driven and rotated independent of other ones of said plurality of reflectors;
   selectively braking to cease rotation of each said reflector when the desired reflecting angle is achieved, wherein the selective braking is performed through selective driven actuation of a second driven wheel connected to each said reflector; and
   establishing a resting position of each said reflector, wherein the resting position of each said reflector is unique with respect to the remainder of said reflectors, and the selective driven rotation and the selective braking of said plurality of reflectors is performed asynchronously and sequentially, one of said reflectors after the other.

15. The method of asynchronous remote steering of reflectors according to claim 14, further comprising the step of calibrating the selective driven rotation and the selective braking of said plurality of reflectors.

16. The method of asynchronous remote steering of reflectors according to claim 15, wherein said step of calibrating the selective driven rotation and the selective braking of said plurality of reflectors comprises performing remote measurements of angular position of each said reflector.

17. The method of asynchronous remote steering of reflectors according to claim 16, wherein said step of performing the remote measurements of the angular position of each said reflector includes measuring the angular position with a laser.

18. The method of asynchronous remote steering of reflectors according to claim 17, further comprising the step of selectively stopping braking of said plurality of reflectors to position each said reflector in a pre-determined non-focusing rotational position.

* * * * *